United States Patent [19]

Brailsford

[11] Patent Number: 4,475,068
[45] Date of Patent: Oct. 2, 1984

[54] BRUSHLESS DIRECT CURRENT MOTOR WITH MAGNETICALLY OPERATED COMMUTATING SWITCH MEANS

[76] Inventor: Harrison D. Brailsford, 670 Milton Rd., Rye, N.Y. 10580

[21] Appl. No.: 287,153

[22] Filed: Jul. 27, 1981

Related U.S. Application Data

[63] Continuation of Ser. No. 126,738, Mar. 3, 1980, abandoned.

[51] Int. Cl.³ .............................................. H02K 29/00
[52] U.S. Cl. .................................. 318/254; 318/138; 318/439
[58] Field of Search .................. 318/138, 254 A, 750, 318/439

[56] References Cited

U.S. PATENT DOCUMENTS

| | | | |
|---|---|---|---|
| 2,705,770 | 4/1955 | Suhr | 318/750 |
| 3,375,422 | 3/1968 | Boudigues | 318/138 |
| 3,678,359 | 7/1972 | Peterson | 318/254 |
| 3,900,780 | 8/1975 | Tanikoshi | 318/254 |

OTHER PUBLICATIONS

Type UGN-3013T Solid-State Ultra Low Cost 'Hall Effect' Digital Switches, Sprague, 10-2-78.

Primary Examiner—David Smith, Jr.
Attorney, Agent, or Firm—Donald P. Gillette

[57] ABSTRACT

Current to the stator coils 21-24 of a brushless DC motor is commutated by making transistors 42 and 43 alternately conductive by current through magnetically actuated switches 37 and 33 (or 51 and 52). These switches are actuated by magnetic fields from the permanently magnetized poles of a magnet 31 (or 47) attached to, but spaced from the rotor 11 and the stator poles 17-20. Depending on the polarity of the magnetic fields, the switches 37 and 33 (51 and 52) permit one of the transistors 42 or 43 to be biased by a voltage source that causes that transistor to become conductive and, simultaneously, connects the base of the other transistor to a voltage that causes that transistor to become nonconductive. Conductivity of the transistors 42 and 43 alternates as the rotor 11 rotates.

5 Claims, 4 Drawing Figures

BRUSHLESS DIRECT CURRENT MOTOR WITH MAGNETICALLY OPERATED COMMUTATING SWITCH MEANS

This is a continuation of application Ser. No. 126,738, filed Mar. 3, 1980, now abandoned.

BACKGROUND OF THE INVENTION

This invention relates to commutation of the stator circuit of brushless DC motors using magnetically actuated switches responsive to the field from a rotating permament magnet on the rotor shaft to control the conductivity of semiconductor means connected to stator coils to start and run the motor.

In my U.S. Pat. No. 3,569,806, a two-transistor bistable commutator circuit is connected to the stator coils of a brushless DC motor to control current through the coils when the motor is running. The starting circuit uses illumination from an incandescent light source to activate one or the other of two photoconductive devices connected to the bases of the two transistors. A shutter attached to the rotor to rotate with it allows light from the source to reach only one of the photoconductive devices at a time. When power is applied to start the motor, the photoconductive device that is initially illuminated depends on the position at which the rotor and shutter had come to a stop. Each photoconductive device is connected to one of the transistors, and the transistor to which the photoconductive device that is first illuminated is connected is the transistor that must become conductive to cause starting current to flow in the correct stator coil or coils. Stator flux from this coil, or set of coils, causes the rotor to start turning in the correct direction.

Bistable circuits normally have two states of conductivity and remain in either of those states indefinitely until triggered into the other state by a suitable signal. In U.S. Pat. No. 3,569,806, the triggering voltage is initially derived from the two photoconductive devices, but once the motor is running, the light source may be turned off. Thereafter, the triggering signals to cause reversal of the conductivity of the two transistors are obtained across the respective sets of stator coils. Such voltages are produced as long as the rotor continues to turn, but if it is stopped by an excessive mechanical load, it may not start again unless the light source is re-energized.

In my co-pending application Ser. No. 918,711 entitled BRUSHLESS MOTOR CONTROLLED BY RADIANT ENERGY, two sets of stator coils are provided. Each of these sets is connected in series with the emitter-collector output circuit of its own transistor. The transistors are not connected to each other to apply actuating signals from one set of stator coils to the other. As a result, the two sides of the commutating circuit are electrically independent of each other, and each is actuated by electro-optical means consisting of separate light-emitting diodes (L.E.D's) positioned to direct light to an adjacent photoconductive diode. The photoconductive diodes are connected to the respective bases of the commutating transistors, and light from each of the L.E.D's is controlled by an episcotister so that only one of the photoconductive diodes at a time receives light from its respective L.E.D. The photoconductive diode thus energized at any given instant is the one that must be energized to cause the transistor to which it is connected to be conductive in order to draw current through the proper stator coil, or coils, to cause the rotor to start rotating or to continue to rotate, as required.

In the circuit just described, each of the photoconductive diodes acts like a single-pole, single-throw switch. It is only because the photoconductive diodes receive light by way of the same episcotister that they cooperate in their operation so that they are, in effect, a single-pole double-throw switch that supplies actuating signals alternately to the bases of the two commutating transistors. Since this circuit does not depend on feedback from one transistor to the other, and since the L.E.D's need not be turned on because they draw so little current that they do not substantially reduce the life of a battery that operates the motor, the motor is always in condition to start, even if it is momentarily stopped by an excessive load.

OBJECTS AND SUMMARY OF THE INVENTION

It is one of the objects of this invention to provide a simplified and improved commutating circuit using magnetically actuated switches to cause the commutating semiconductor means of a brushless DC motor to be connected to a suitable actuating voltage source only at the proper times.

It is another object of this invention to provide, in a semiconductor commutating circuit for a brushless DC motor, a magnetically operated switch that connects the control electrode of the semiconductor element to a bias source to make the semiconductor conductive when the switch is in a magnetic field of one polarity and to short-circuit the input circuit of the semiconductor when the switch either is in a magnetic field of the opposite polarity or is in a magnetic field of substantially zero strength.

It is still another object of this invention to provide a circuit in which Hall effect devices operate as switching means connected to the bases of commutating transistors either to be grounded or to be connected to a biasing source that causes that transistor to become conductive.

In accordance with this invention, a rotor having an even number of poles permanently magnetized around its perimeter is rotatably supported with a ferromagnetically soft stator structure that has a corresponding number of stator poles. All of the poles, both rotor and stator poles, are angularly displaced from each other by the same number of degrees, and since there is an even number of rotor poles and an even number of stator poles, each pole has a diametrically opposite corresponding pole. In the case of the rotor poles, the diametrically opposite poles are of the same magnetic polarity, and in the case of the stator poles, windings are provided on each one and are connected so that current through selected ones of these windings by a commutating circuit causes diametrically opposite stator poles to be of like magnetic polarity.

The windings on the stator poles are connected in series with output terminals of a semiconductor device, such as the emitter-collector terminals of a transistor. Since diametrically opposite stator poles are energized at the same time, the windings on each pair of such poles are connected to the same semiconductor device. Each of these pairs of windings is connected to the output terminals of the semiconductor device that controls current flow through those particular windings.

Thus there is a separate circuit for each pair of diametrically opposite stator poles.

In the present design the motor has four stator poles and four rotor poles. The stator poles are divided into two diametrically opposide pairs of poles, the poles of one pair being perpendicular to those of the other pair. By energizing the windings on one pair of stator poles to cause the faces of those poles adjacent the permanent magnet rotor to have the correct magnetic polarity, the faces of the other two poles take on the opposite magnetic polarity. As a result of the magnetic fields of the poles, the permanently magnetized rotor starts to revolve as the rotor poles attempt to align themselves with stator poles of the opposite polarity.

Before the rotor poles reach such alignment, current to the stator pole windings originally energized is interrupted, and current of the proper polarity is caused to flow through the windings on the other pair of stator poles. The windings on one pair of stator poles are connected to one semiconductor device and those on the other pair are connected to a second such device. By alternating the energization of the semiconductors to allow stator coil current to flow through them at the proper times, the rotor can be made to continue to rotate.

In accordance with this invention, separate magnetically actuated switches are connected between the control electrode of each of the semiconductor devices and a suitable electrical source. The magnetically actuated switches are located adjacent a permanently magnetized member attached to the rotor to rotate with it but spaced from the rotor so that only the magnetic flux from the permanently magnetized member actuates the switches. The magnetically actuated switches may be Hall effect devices switches that have three terminals each: one connected to a biasing source of the proper polarity and sufficient magnitude to cause the semiconductor device to become conductive; a second to a voltage point of a polarity that causes the semiconductor device to become or to remain non-conductive; and a third to the control electrode of the respective semiconductor device. When flux of one polarity interacts with the switch, the control electrode of the semiconductor is connected to the biasing source that causes that semiconductor to become conductive. When the switch is within the field of a rotor pole of opposite polarity or is in a zero magnetic field, the switch connects the control electrode to ground, or more precisely, short-circuits the semiconductor device, thereby causing the device to become non-conductive.

In order to cause the current to flow through the stator coils at the proper times to initiate and maintain rotation of the rotor, the switches are oriented around the rotating permanently magnetized member to be affected by the magnetic fields of its poles at the proper time relative to the instantaneous positions of the rotor poles relative to the stator poles. In the case of a four pole motor, the switches are placed 90° apart as measured from the center of rotation of the rotor.

DETAILED DESCRIPTION OF THE PREFERRED EMBODIMENT

Figure 1:
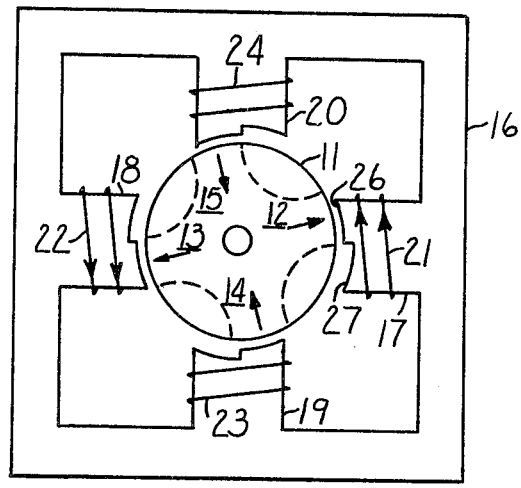
FIG. 1 shows the stator and rotor pole arrangement of a motor constructed to use a commutating circuit according to this invention.

FIG. 1 shows the basic magnetic components of a brushless DC motor, including a rotor 11 with four permanently magnetized poles 12-15 of which the poles 12 and 13 are north poles and 14 and 15 are south poles. The motor also includes a ferromagnetically soft stator 16 that has two pairs of diametrically opposite stator poles 17, 18 and 19, 20. The stator coils 21-24 are wound on the stator poles 17-20, respectively.

The pole faces of the stator poles are shaded, which is to say that, in this embodiment, they are not uniformly spaced from the center of rotation of the rotor 11. For example, the pole 17 has one face section 26 that is closer to the center of rotation than is another face section 27. The other three stator poles 18-20 have pole faces substantially identical with the face of the pole 17.

The rotor 11 comes to rest in one of four positions when all stator coil current is turned off. However, since two of those positions are mirror images of the other two, it may be considered that the rotor 11 has only two quiescent positions. One of those positions is illustrated in FIG. 1 and the other position would be identical to the one shown except that the rotor 11 would be rotated 90° or 270° so that the locations of the north and south poles of the rotor would be interchanged.

Because of the shading of the stator poles 13-16, the quiescent positions of the centers of the rotor poles 12-15 are offset from exact alignment with the geometrical centers of the stator poles to facilitate starting, as will be described later.

Figure 2:
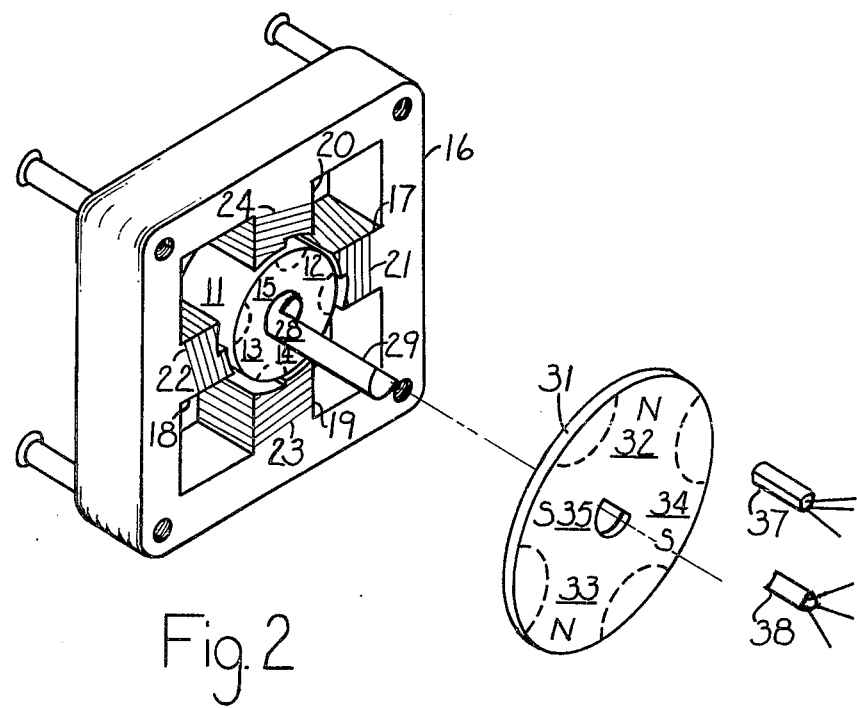
FIG. 2 is an exploded perspective view of the magnetic components of a motor according to the present invention.

FIG. 2 shows more of the mechanical components of the motor, including a shaft or axle, 28 having a flat surface 29 onto which a permanently magnetized disc 31 is keyed so as to rotate with the rotor. The disc 31 is thus part of the rotor assembly. This disc 31 has four magnetic poles 32-35 spaced 90° apart in the same fashion as the poles 12-15 in the rotor 11. Two magnetically actuated switches 37 and 38 are located close enough to the disc 31 to be actuated by the fields of poles 32-35. Depending on the arrangement of poles in the disc 31 and on the circuit to which the switches 37 and 38 are connected, these switches operate in response to magnetic fields of only one polarity. For example, the switches may respond only to the flux from north poles 32 and 33. The magnetically actuated switches 37 and 38 are mounted so as to be displaced far enough from the stator coils 21-24 to prevent any interaction from the magnetic fields produced by these coils, or by the rotor 11.

Figure 3:
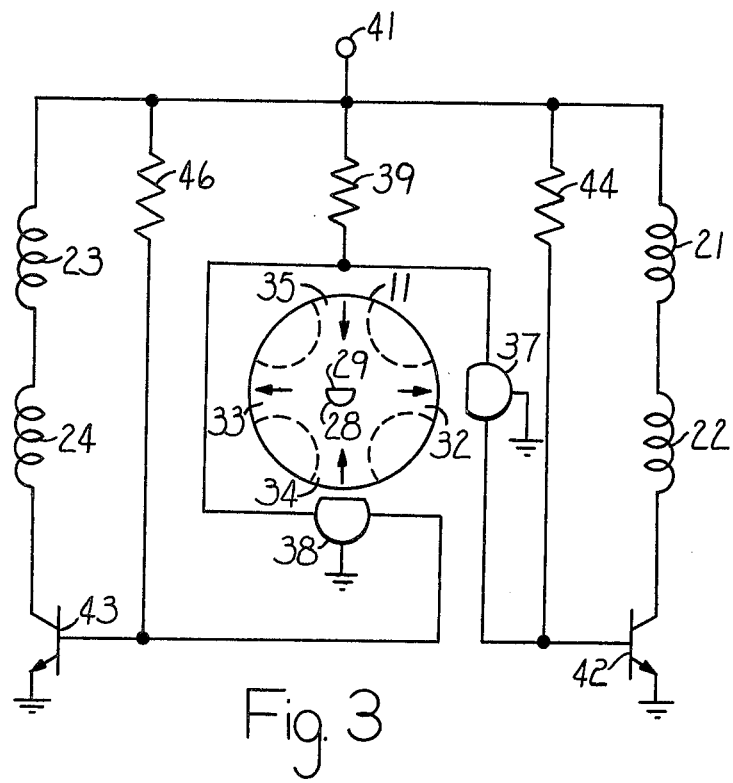
FIG. 3 is a schematic circuit diagram of a commutating circuit according to the present invention.

The commutating circuit in FIG. 3 is arranged to control the operation of the stator coils 21-24 in FIGS. 1 and 2. In this embodiment, the magnetically actuated switches 37 and 38 are Hall effect switches, for example Texas Instrument type TL170C switches, spaced apart by 90° around the axis of rotation of the disc 31. These are three-terminal switches, and one terminal of each switch is connected through a resistor 39 to a positive power supply terminal 41. In accordance with standard practice, the terminal 41 can be connected by way of a switch (not shown) to a positive battery terminal or other source of power to supply the proper current and voltage to operate the circuit. A second terminal of each switch is connected to ground. The third terminal of the switch 37 is connected to the base, or control electrode, of a first NPN transistor 42 and the third terminal of the switch 38 is connected to the base of a similar NPN transistor 43. The emitters of each of the transistors 42 and 43 are connected to ground, and the collectors are connected to the positive power supply terminal 41 through the stator coils 21, 22 and 23, 24, respectively. Resistors 44 and 46 are shown connected in series between the bases of the transistors 42 and 43, respectively, and the positive power supply terminal 41.

The operation of the switches 37 and 38 is such that, when one of these switches, for example, the switch 37, is in the magnetic field of a south pole 34 or 35, of the disc 31, the base of the transistor to which that switch is attached is, in effect, connected to ground. In the case of the switch 38, that means that the base-emitter input circuit of the transistor 43 will be short-circuited. The other switch 38 is in the field of flux of a north magnetic pole, illustrated in FIG. 3 as the pole 32. The operative effect is that the switch 37 does not, at that time, short-circuit the base of the transistor 42 to ground but allows the base to be biased positively from the terminal 41 through the resistor 44. The power supply voltage at the terminal 41 during operation of the motor thus biases the base of the transistor 42 in the forward direction, thereby making that transistor conductive and allowing current to flow through the coils 21 and 22.

As may be seen in FIGS. 1 and 2, current flowing through the coils 21 and 22 in the direction indicated by the arrows on those coils causes the pole faces of the stator poles 17 and 18 to become north poles. Since loops of magnetic flux are always closed, the same flux that causes the faces of the poles 17 and 18 to be south poles causes the faces of the poles 19 and 20 to become north poles. As a result, and due to the angular displacement of the poles 12–15 of the rotor 11 from alignment with the stator poles 17–20, the rotor 11 starts rotating counter-clockwise as soon as a source of current of sufficient magnitude is connected between the terminal 41 and ground.

If the rotor 11 had come to rest in its alternative position with a north pole adjacent the switch 38 and a south pole adjacent the switch 37, the transistor 43 would have been made conductive instead of the transistor 42, and current would flow through the coils 23 and 24 instead of the coils 21 and 22. This would still cause the rotor to start rotating in the counter-clockwise direction and to continue rotating in that direction, as before.

As the rotor 11 rotates, the switches 37 and 38 respond to flux from the north and south poles 32–35 of the magnet 31 in alternation, thereby causing the transistors 42 and 43 to become conductive in corresponding alternation.

Figure 4:
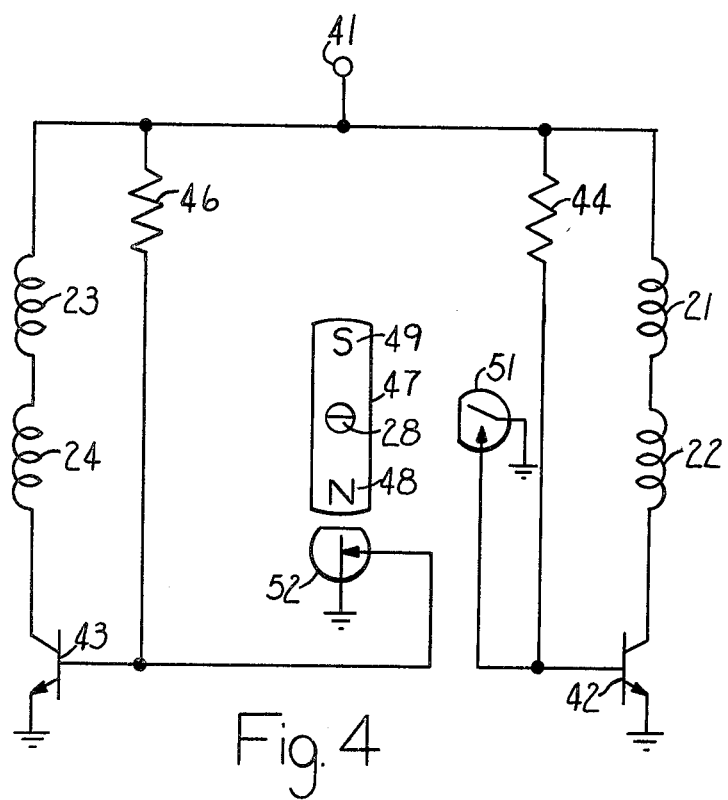
FIG. 4 is a schematic circuit diagram of a modified commutating circuit.

The circuit in FIG. 4 is suitable for use with the same electromagnetic structure as the circuit in FIG. 3 In place of the member 31 with four poles shown in FIG. 3, FIG. 4 shows a rotatable member 47 with two diametrically opposite poles 48 and 49 keyed to the shaft 28. Two magnetically actuated single-pole, single-throw switches 52 and 51 are spaced 90° apart around the path followed by the poles 48 and 49 as the member 47 rotates counter-clockwise with the rotor 11 (FIG. 1).

The switches may be reed switches that close in response to sufficiently strong flux of either polarity. Thus, when the member 47 is in the position shown, the switch 52 is closed, which short circuits the input circuit of the transistor 43. The switch 51 is not in a magnetic field and is therefore not closed. This allows the base of the transistor 42 to be positively biased through the resistor 44 so that it is switched to its conductive state, permitting current to flow through the coils 21 and 22, as is necessary to start the rotor 11 and to keep it rotating.

As the rotor and the member 47 rotate counter-clockwise, they will reach a position at which the flux from the pole 48 will no longer be strong enough to keep the switch 52 closed but will be strong enough to close the switch 51. Under that condition, the transistor 42 will be non-conductive and current can no longer flow through the coils 21 and 22. However, the transistor 43 will be conductive, allowing current to flow through the coils 23 and 24. The rotor poles 12–15 (FIG. 1) will, at that time, be in a position to be impelled to continue to rotate by the stator field thus established.

Although the switches 51 and 52 are 270° apart, as measured counter-clockwise from the location of the switch 51 to the location of the switch 52, the fact that either polarity of flux can actuate the switches means that they will be actuated to shift current from the coils 21 and 22 to the coils 23 and 24 or vice versa each 90° of rotation of the member 47. This shift in current flow is the commutation necessary to keep the rotor 11 and the member 47 rotating.

While this invention has been described in terms of specific components, it will be understood by those skilled in the art that modifications may be made without departing from the true scope of the invention as defined by the following claims. In particular, the Hall effect switches may be replaced by magnetic reed switches or other magnetically operated switches, especially those that have an operation that is the equivalent of the operation of a single-pole single-throw switch.

What is claimed is:

1. An electric motor comprising:
    an armature comprising a rotor having a plurality of pairs of permanently magnetized poles, alternately north and south, spaced apart by predetermined, equal angles around a central axis;
    a separate, permanently magnetized member attached to the rotor to rotate therewith and having a number of poles equal to the number of rotor poles and of alternately north and south polarity and each in a fixed known angular position relative to a corresponding one of the rotor poles;
    support means to support the armature for rotation on the axis to limit movement of each of the rotor poles to a first circular path concentric with the axis and movement of each of the poles of the separate member to a second circular path concentric with the axis;
    a ferromagnetically soft stator comprising a plurality of pairs of magnetizable stator poles, each having a pole face facing the path of the rotor poles and adjacent thereto, each of said pole faces having a section thereof along one side thereof spaced closer to the first circular path than the remainder of the respective said pole face;
    a plurality of stator coil means magnetically coupled to the stator poles to produce stator flux of controlled polarity and fixed magnitude in the stator poles in response to current flow in a predetermined direction in the respective coil means;

semiconductor means connected in series circuits with the stator coil means, each of the semiconductor means comprising a control electrode; and a plurality of magnetically actuated Hall effect switches equal in number to the plurality of stator coil means and physically located adjacent the second path to be actuated by magnetic flux from alternate ones of the poles, which are poles of the same polarity, of the separate, permanently magnetized member, each of the Hall effect switches being electrically connected to the control electrode of a respective one of the semiconductor means to make the respective semiconductor means selectively conductive to produce, in the stator coil means connected in series with the respective semiconductor means, the stator flux of controlled polarity only when one of the rotor poles of a predetermined magnetic polarity is within certain angular boundaries relative to specific ones of the stator poles, the armature having a plurality of rest positions in which the rotor poles of the predetermined magnetic polarity has a rest position within those angular boundaries when none of the semiconductor means are conductive, whereby starting of the armature in the direction of said sections of the stator pole faces relative to the remainder of the respective said pole face and continuation of rotation of the armature from any of the rest positions is is assured when current of sufficient magnitude and proper polarity is made available to all of the series circuits.

2. The motor of claim 1 in which the magnetically actuated Hall effect switch means comprises separate switching means for each of the semiconductor means, each of the Hall effect switch means comprising a first switched terminal connected to the control electrode of the respective semiconductor means and a second terminal, the first terminal being electrically connectable to the second terminal in response to actuation of the switching means by a magnetic flux from the armature poles, and one of the terminals being connected to a biasing voltage source having a voltage of the proper polarity and magnitude to make the semiconductor conductive.

3. The motor of claim 1 in which each of the series circuits comprises a transistor and at least one of the stator coils connected in series with the emitter-collector circuit of the transistor, and each of the separate switching means has its first terminal connected to a source of voltage of the same polarity, relative to the control electrode, as the collector and its second terminal connected to the emitter of the transistor.

4. The motor of claim 1 in which each of the separate switching means comprises a Hall effect switching device located adjacent the circular path along which the poles of the separate, permanently magnetized member move, the second terminal of each of the Hall effect switching devices being connected to a charge source electrode of the respective semiconductor means, each of the Hall effect switching devices connecting the control electrode of the respective semiconductor means to the second terminal only in response to magnetic flux of one polarity and a predetermined density.

5. The motor of claim 1 in which:

the second permanently magnetized member comprises a polurality of permanently magnetized poles spaced apart, alternately north and south, by the same angular separations around the central axis as the poles of the rotor; and the magnetically actuated switch means are adjacent the path of the poles on the second permanently magnetized member and sufficiently spaced from the stator poles and the poles on the rotor to be controlled only by the fields of the poles of the second permanently magnetized member.

* * * * *